(12) United States Patent
Hac

(10) Patent No.: US 6,735,510 B2
(45) Date of Patent: May 11, 2004

(54) DYNAMIC SIDE TO SIDE BRAKE PROPORTIONING

(75) Inventor: Aleksander B. Hac, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 3 days.

(21) Appl. No.: 09/977,117

(22) Filed: Oct. 12, 2001

(65) Prior Publication Data

US 2003/0074122 A1 Apr. 17, 2003

(51) Int. Cl.$^7$ ................................................ G06F 19/00
(52) U.S. Cl. .............................. 701/70; 701/72; 701/78; 303/155; 303/189
(58) Field of Search ......................... 701/70, 72, 75, 701/78, 38; 303/146, 189, 140, 155

(56) References Cited

U.S. PATENT DOCUMENTS

| | | | |
|---|---|---|---|
| 4,666,013 A | | 5/1987 | Shibahata et al. |
| 5,172,961 A | | 12/1992 | Inoue et al. |
| 6,021,397 A | * | 2/2000 | Jones et al. .................. 705/36 |
| 6,280,003 B1 | * | 8/2001 | Oshiro et al. ............. 303/9.62 |
| 6,332,104 B1 | * | 12/2001 | Brown et al. .................. 701/1 |
| 6,409,287 B1 | * | 6/2002 | Leach et al. ................ 303/146 |

FOREIGN PATENT DOCUMENTS

| | | |
|---|---|---|
| DE | 44 19 131 A1 | 12/1994 |
| DE | 101 01 197 A1 | 1/2001 |

OTHER PUBLICATIONS

Helmut Fennel, ITT Automotive Europe GmbH Brake and Chassis Systems, "*ASMS–ESBS: Two ITT Safety Systems Complementing Each Other Perfectly*", SAE Active Safety Including ABS Effectiveness, Vehicle Dynamic Control and Collision Avoidance TOPTEC, Monday, Sep. 22—Tuesday, Sep. 23, 1997.

Heinz Leffler, Reinhard Auffhammer, Reent Heyken and Harald Roth, "*New Driving Stability Control System with Reduced Technical Effort for Compact and Medium Class Passenger Cars*", International Congress and Exposition, Detroit, Michigan, Feb. 23–26, 1998, pp. 1–8.

* cited by examiner

Primary Examiner—Thomas C. Black
Assistant Examiner—Arthur D. Donnelly
(74) Attorney, Agent, or Firm—Michael D. Smith

(57) ABSTRACT

A dynamic side-to-side braking method is disclosed. First, when the vehicle is in a combined braking and cornering maneuver, a desired braking force among tires of a vehicle is determined. Second, a brake force distribution of the desired braking force among the tires is determined. The brake force distribution is approximately proportional to a normal force distribution among the tires during the combined braking and cornering maneuver by the vehicle. When the vehicle excludes an active steering system, front or rear, the brake force distribution is determined as a function of a feedback correction to counterbalance a portion of a yaw moment experienced by the vehicle during the combined braking and cornering maneuver. When the vehicle includes an active steering system, front or rear, a steering correction is determined to counterbalance a portion of the yaw moment experienced by the vehicle during the combined braking and cornering maneuver.

20 Claims, 8 Drawing Sheets

DYNAMIC SIDE TO SIDE BRAKE PROPORTIONING

BACKGROUND OF THE INVENTION

1. Field of the Invention

The present invention generally relates to control systems for automotive vehicles. The present invention specifically relates to a control of a brake system of an automotive vehicle for improving vehicle transient and steady state performance in a combined braking and steering maneuver by the vehicle, and an integrated control of a brake and steering system of an automotive vehicle for improving vehicle transient and steady state performance in a combined braking and steering maneuver by the vehicle.

2. Description of the Related Art

Recently many vehicles have been produced with brake systems which can independently control brake forces (i.e., torques) of individual wheels. Many automakers and automotive suppliers are also developing brake by wire systems (e.g., electric or electro-hydraulic) which will give designers more freedom than ever before in controlling braking forces of individual wheels in response to instantaneous conditions of motion as well as access to additional measured signals. At the same time, some vehicles are offered with active rear wheel steer systems, and an intense development efforts continue in the area of augmented front steer or steer by wire systems.

Most efforts in the area of brake control algorithms are focused on improving brake control in an anti-lock braking system (ABS) mode of operation and a vehicle stability enhancement (VSE) mode of operation. These modes of operations are active only when a vehicle is at or very close to the limit of adhesion. During base braking, the brake force distribution typically used is symmetric left to right. Thus, it is not affected by vehicle cornering and is optimized for straight line braking. Therefore, transient response of many vehicles in combined steering and braking maneuvers is less than ideal with a tendency of the vehicle to oversteer and to prematurely enter into ABS mode of operation due to reduced normal loads on the pair of inside tires.

More specifically, FIGS. 1A–1C illustrate the fundamental physical principles of a vehicle 10 in a combined braking and right hand cornering maneuver. As shown in FIG. 1A, vehicle 10 is subjected to a longitudinal force $F_{LO}$ equaling $m^*a_x$ and a lateral inertial force FLA equaling $m^*a_y$, where m is a mass of vehicle 10, $a_x$ is a longitudinal acceleration of vehicle 10, and $a_y$ is a lateral acceleration of vehicle 10. A pitch and roll moment of vehicle 10 during the maneuver is due to the longitudinal force $F_{LO}$ and the lateral inertial force $F_{LA}$ in combination with various pitch forces $P_{LF}$, $P_{RF}$, $P_{LR}$, and $P_{RR}$, and various roll forces $R_{LF}$, $R_{RF}$, $R_{LR}$, and $R_{RR}$, applied to a left front tire 11a, a right front tire 11b, a left rear tire 11c, and a right rear tire 11d, respectively. The pitch and roll moment of vehicle 10 is balanced by various normal forces $N_{LF}$, $N_{RF}$, $N_{LR}$, and $N_{RR}$ being applied to left front tire 11a, right front tire 11b, left rear tire 11c, and right rear tire 11d, respectively. As a result, a normal load distribution among tires 11a–11d is shifted from rear tires 11c and 11d to front tires 11a and 11b due to braking, and from inside tires 11b and 11d to outside tires 11a and 11c due to cornering. Consequently, as shown in FIG. 1B, left front tire 11a carries the largest normal load and right rear tire 11d carries the smallest normal load.

The vectors of forces $V_{LF}$, $V_{RF}$, $V_{LR}$, and $V_{RR}$ in the yaw (horizontal) plane of vehicle 10 developed by each tire 11a–11d, respectively, must remain within a corresponding friction circle 12a–12d, respectively, whose radii are equal to products of a surface coefficient of adhesion μ and the corresponding normal force $N_{LF}$–$N_{RR}$. If tires 11a–11d are on a relatively uniform surface, the maximum available tire forces in the yaw plane are approximately proportional to normal forces $N_{LF}$–$N_{RR}$. With the brake proportioning techniques known in the art, the brake forces on both sides of vehicle 10 are approximately the same. Thus, during braking, the friction potential of outside tires 11a and 11c is underutilized while inside tires 11b and 11d enter ABS too early. In a 3-channel system, an ABS mode is entered on both rear wheels 11c and 11d simultaneously whereby a further reduction in longitudinal forces is generated.

Another undesirable consequence of traditional brake force distribution during a braking and cornering maneuver is that vehicle 10 exhibits a tendency to oversteer, especially under light to moderate braking. FIG. 1C illustrates a simplified bicycle model of vehicle 10 for explaining the aforementioned oversteer condition of vehicle 10. Prior to braking during a steady state cornering, a lateral force $F_{yfa}$ applied to a front axle (not shown) of vehicle 10 and a lateral force $F_{yra}$ applied to a rear axle (not shown) of vehicle 10 balance each other whereby a yaw moment $M_Z$ about a center of mass 13 of vehicle 10 is approximately zero in accordance with the following equation [1]:

$$M_z = F_{yfa}*a - F_{yra}*b = 0 \quad [1]$$

where a is a longitudinal distance between the front axle and center of mass 13, and b is a longitudinal distance between the rear axle and center of mass 13. Lateral force $F_{yfa}$ and lateral force $F_{yra}$ correspond to side slip angles of front tire 11a and rear tire 11c, respectively, with the side slip angle of front tire 11a being larger than the side slip angle of rear tire 11c.

When brakes are applied to front tire 11a and rear tire 11c, normal force $N_{LF}$ is increased on front tire 11a and normal force $N_{FR}$ is reduced on rear tire 11c. Thus, if the side slip angles of front tire 11a and rear tire 11c were to be maintained, an increase in lateral force $F_{yfa}$ on the front axle that is nearly proportional to normal force $N_{LF}$ would occur while a decrease in lateral force $F_{yra}$ on the rear axle that is nearly proportional to normal force $N_{LR}$ would occur. This imbalance between lateral force $F_{yfa}$ and lateral force $F_{yra}$ increases yaw moment $M_Z$ in accordance with the following equation [2]:

$$M_z = F_{yfa}*a - F_{yra}*b > 0 \quad [2]$$

Consequently, the yaw rate of vehicle 10 increases until a new steady state is reached. Another effect of braking is a reduction of lateral force $F_{yfa}$ and lateral force $F_{yra}$ due to development of longitudinal forces (not show). This effect produces an opposite result than illustrated in FIG. 1C, but the effect is significantly small for light and moderate braking, and therefore the first effect dominates. In this new steady state, the side slip angle of rear tire 11c is larger than prior to braking and the slide slip angle of front tire 11a is lower than prior to braking. This is essentially one of the definitions of vehicle oversteer.

There is therefore a need for a brake control method for overcoming the aforementioned shortcomings described herein. The present invention addresses this need.

SUMMARY OF THE INVENTION

The present invention provides a novel and unique method and system for improving vehicle transient and steady state performance in a combined braking and steering maneuver by using side to side proportioning of braking forces during braking in a turn. Accordingly, the present invention applies to any brake system that provides means of controlling brake forces among wheels in various proportions (e.g., a hydraulic brake system, an electric brake by wire system, and a hybrid of a hydraulic brake system and an electric brake by wire system). While the present invention is not limited to any particular implementation scenario, the intended area for implementing the present invention is mainly in the range of a performance envelope below the activation of prior art brake control algorithms related to ABS and VSE.

One form of the present invention is a method of dynamically controlling an operation of a vehicle during a combined braking and cornering maneuver by the vehicle. First, a desired brake force for a plurality of tires of the vehicle is determined. Second, a brake force distribution of the desired brake force among the plurality of tires is determined. The brake force distribution is approximately proportional to a normal force distribution among the plurality of tires during the combined braking and cornering maneuver.

A second form of the present invention is vehicle comprising a plurality of tires and a brake controller. The brake controller is operable to determine a desired brake force for the tires during a combined braking and cornering maneuver by the vehicle. The brake controller is further operable to determine a brake force distribution of the desired brake force among the tires with the brake force distribution being approximately proportional to a normal force distribution among the plurality of tires during the combined braking and cornering maneuver.

The foregoing forms, and other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENTLY PREFERRED EMBODIMENTS

Figure 1A:
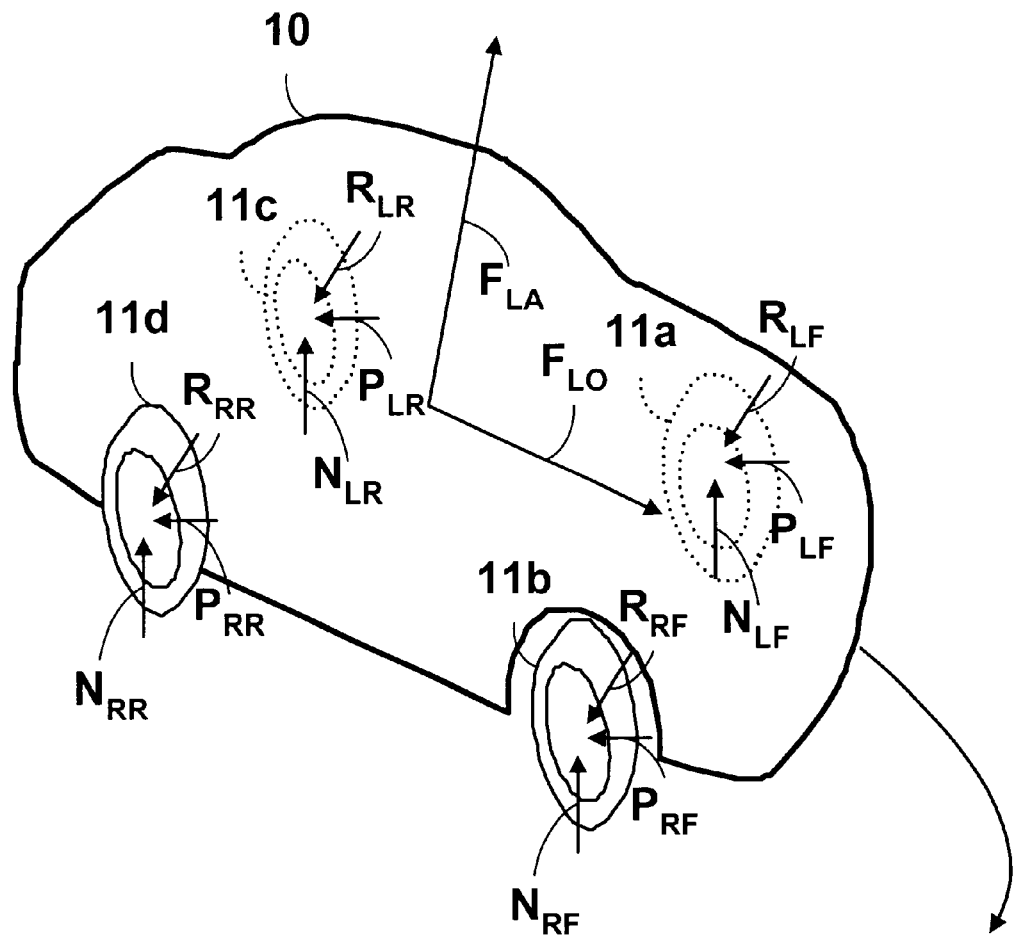
FIG. 1A is an illustration of various forces as known in the art that are applied to a vehicle and tires of the vehicle during a right hand turning maneuver of the vehicle.
Figure 1B:
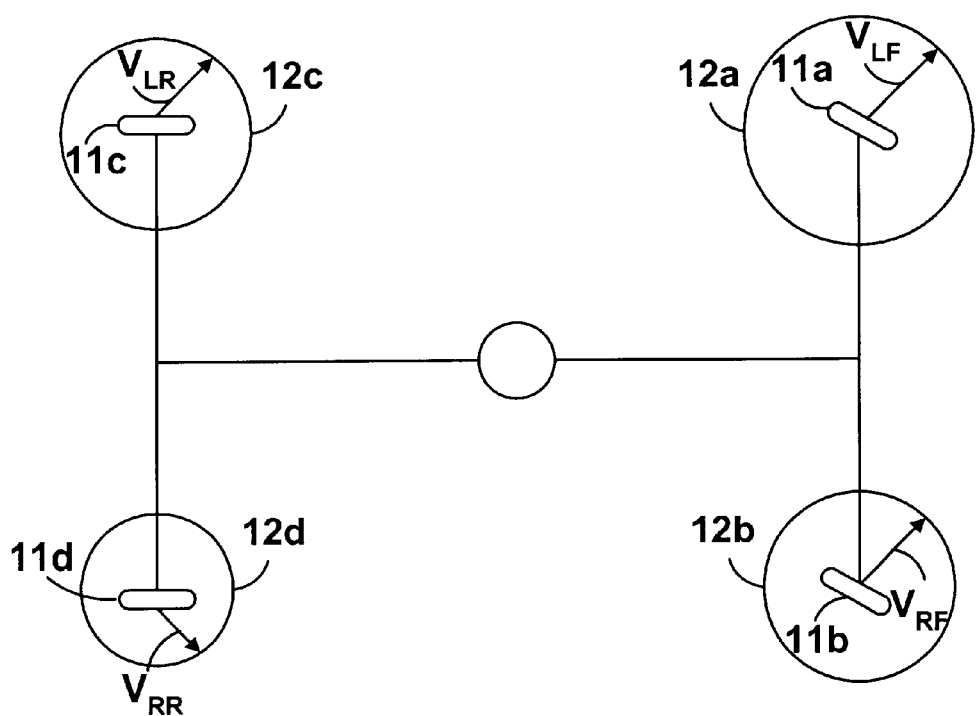
FIG. 1B is a vector diagram illustrating various vector forces as known in the art that are experienced by the vehicle of FIG. 1A during the right hand turning maneuver.
Figure 1C:
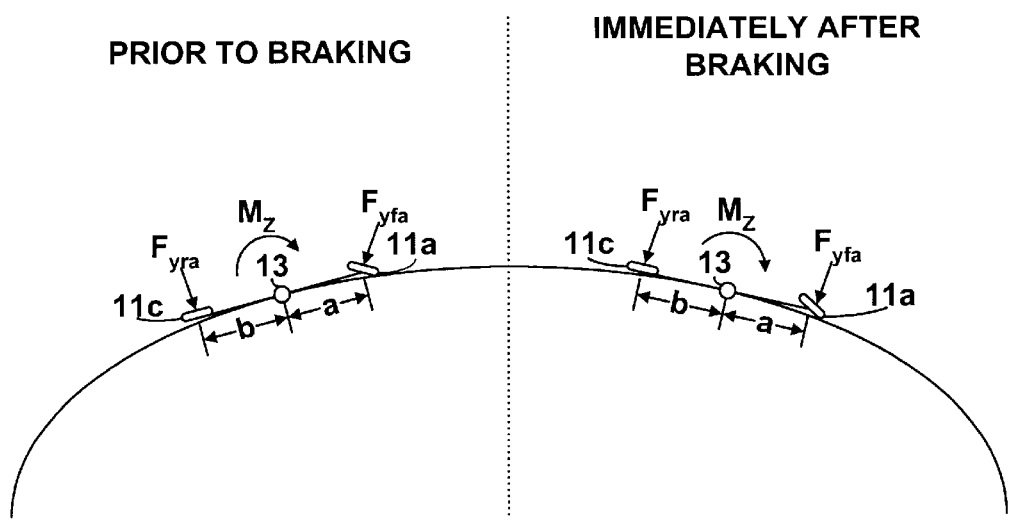
FIG. 1C is an illustration of a bicycle model as known in the art of the FIG. 1A during the right hand turning maneuver.
Figure 2A:
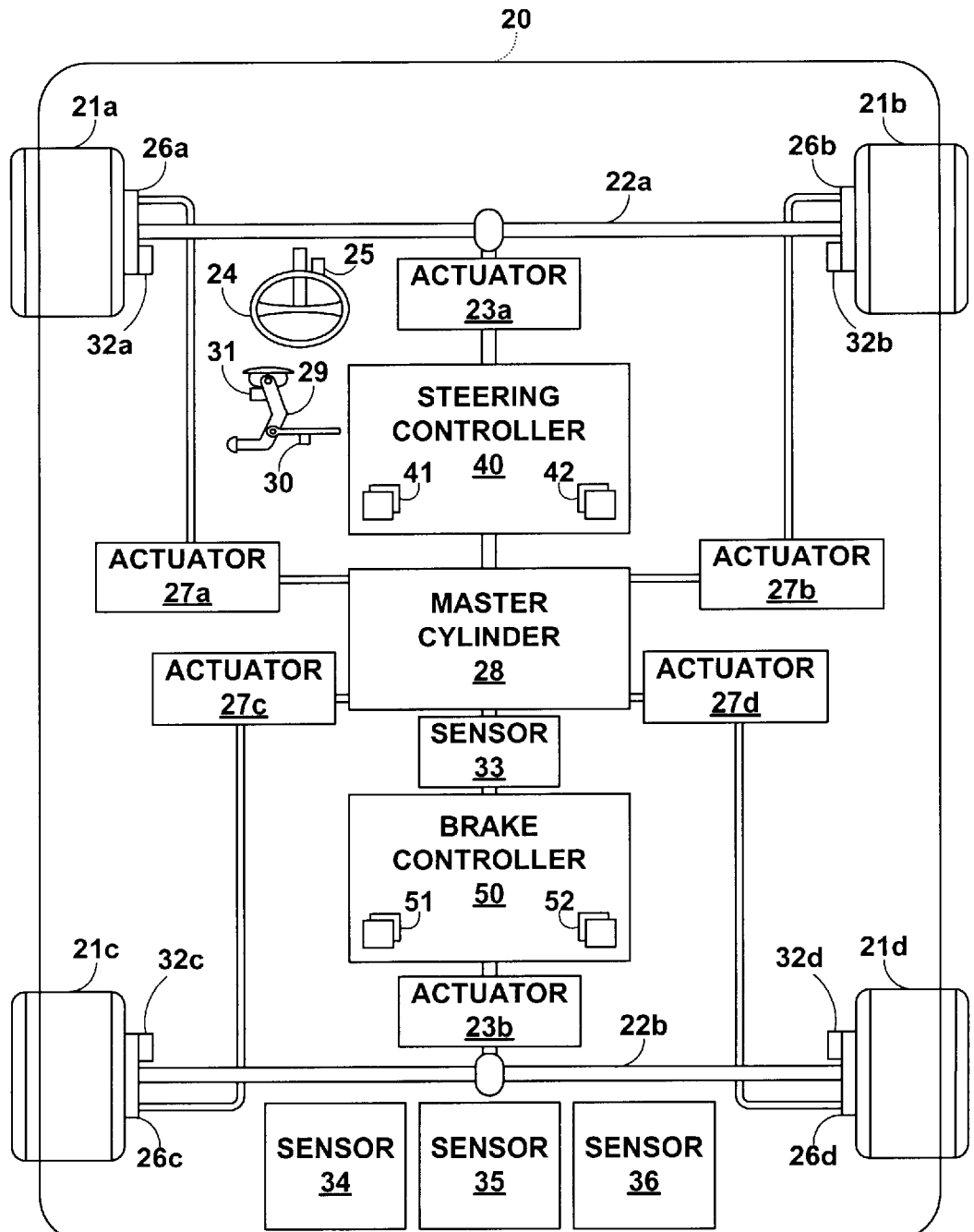
FIG. 2A is an illustration of a vehicle in accordance with the present invention.
Figure 2B:
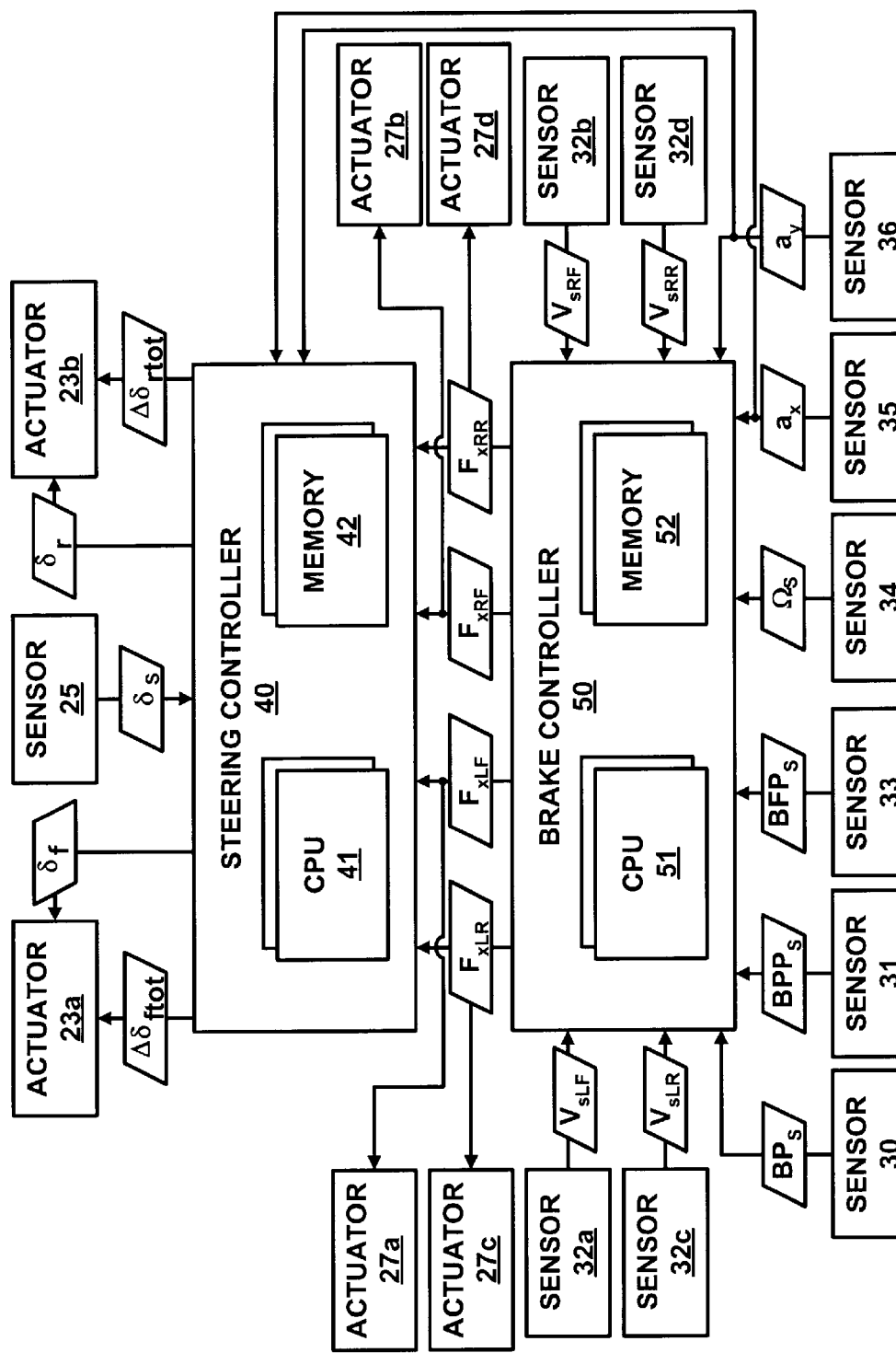
FIG. 2B is a block diagram illustrating a steer controller and a brake controller in accordance with the present invention.

FIGS. 2A and 2B illustrate a steering controller 40 and a brake controller 50 in accordance with the present invention as installed in a vehicle 20 having a left front tire 21a, a right front tire 21b, a left rear tire 21c, and a right rear tire 21d. Left front tire 21a and right front tire 21b are coupled to a front axle 22a while left rear tire 21c and right rear tire 21d are coupled to a rear axle 22b. A conventional front steering actuator 23a applies a steering angle to left front tire 21a and right front tire 21b relative to front axle 22a in response to a reception of a front steering angle signal $\delta_f$ and/or a reception of a front steering correction signal $\Delta\delta_{ftot}$ from steering controller 40. A conventional rear steering actuator 23b applies a steering angle to left rear tire 21c and right rear tire 21d relative to rear axle 22b in response to a reception of a rear steering angle signal $\delta_r$ and/or a reception of a rear steering correction signal $\Delta\delta_{rtot}$ from steering controller 40.

Steering controller 40 conventionally provides front steering angle signal $\delta_f$ to front steering actuator 23a and rear steering angle signal $\delta_r$ rear steering actuator 23b in response to a reception of a steering angle signal $\delta_s$ from a conventional steering wheel sensor 25 coupled to a steering wheel 24. As will be further described herein in connection with FIG. 5, steering controller 40 provides front steering correction signal $\Delta\delta_{ftot}$ to front steering actuator 23a and rear steering correction signal $\Delta\delta_{rtot}$ to rear steering actuator 23b in response to a reception of either a left front braking signal $F_{xLF}$, a right front braking signal $F_{xRF}$, a left rear braking signal $F_{xLR}$, and a right rear braking signal $F_{xRR}$ from brake controller 51, or a reception of a longitudinal acceleration signal $a_x$ from a conventional sensor 35 and a lateral acceleration signal $a_y$ from a conventional sensor 36.

Steering controller 40 is an electronic circuit comprised of one or more components that are assembled as a common unit. Alternatively, for the multiple component embodiments, one or more of these components may be distributed throughout vehicle 20. Steering controller 40 may be comprised of digital circuitry, analog circuitry, or both (e.g. an application specific integrated circuit). Also, steering controller 40 may be programmable, a dedicated state machine, or a hybrid combination of programmable and dedicated hardware. All signals described herein can be either in analog form or digital form. Thus, to implement the principals of the present invention, steering controller 40 can further include any control clocks, interfaces, signal conditioners, filters, Analog-to-Digital (A/D) converters, Digital-to-Analog (D/A) converters, communication ports, or other types of operators as would occur to those having ordinary skill in the art.

In one embodiment, steering controller 40 includes one or more central processing units 41 operatively coupled to one or more solid-state memory devices 42. Memory device(s) 42 contain programming corresponding to a flowchart 80 (FIG. 5) for implementing a dynamic side-to-side braking method of the present invention and is arranged for reading and writing of data in accordance with the principals of the present invention.

A conventional brake 26a is coupled to left front tire 21a with a conventional brake actuator 27a applying a brake force via a conventional master cylinder 28 to left front tire 21a in response to a reception of left front braking signal $F_{xLF}$ from brake controller 50. A conventional brake 26b is coupled to right front tire 21b with a conventional brake actuator 27b applying a brake force via master cylinder 28 to right front tire 21b in response to either a reception of right front braking signal $F_{xRF}$ from brake controller 50. A conventional brake 26c is coupled to left rear tire 21c with a conventional brake actuator 27c applying a brake force via master cylinder 28 to left rear tire 21c in response to a reception of left rear braking signal $F_{xLR}$ from brake controller 50. A conventional brake 26d is coupled right rear tire 21d with a conventional brake actuator 27d applying a brake force via master cylinder 28 to right rear tire 21d in response to a reception of right rear braking signal $F_{xRR}$ from brake controller 50.

Brake controller 50 provides left front braking signal $F_{xLF}$, right front braking signal $F_{xRF}$, left rear braking signal $F_{xLR}$, and right rear braking signal $F_{xRR}$ in response to either a reception of a brake pedal switch signal $BP_s$ from a conventional brake pedal switch 30 coupled to brake pedal 29 and/or a reception of a brake pedal position or brake pedal force signal $BPP_s$ from a conventional brake pedal position or force sensor 31 coupled to brake pedal 29. Brake controller 50 receives additional signals indicative of various operative conditions of vehicle 20 to thereby determine the magnitudes of left front braking signal $F_{xLF}$, right front braking signal $F_{xRF}$, left rear braking signal $F_{xLR}$, and right rear braking signal $F_{xRR}$. Specifically, brake controller 50 receives a left front tire speed signal $V_{sLF}$ from a conventional speed sensor 32a coupled to left front tire 21a. Brake controller 50 receives a right front tire speed signal $V_{sRF}$ from a conventional speed sensor 32b coupled to right front tire 21b. Brake controller 50 receives a left rear tire speed signal $V_{sLR}$ from a conventional speed sensor 32c coupled to left rear tire 21c. Brake controller 50 receives a right rear tire speed signal $V_{sRR}$ from a conventional speed sensor 32d coupled to right rear tire 21d. Brake controller 50 also receives a brake fluid pressure signal $BFP_s$ from a conventional brake fluid pressure sensor 33 coupled to master cylinder 28, a yaw rate signal $_s$ from a conventional yaw rate sensor 34, longitudinal acceleration signal $a_x$ from sensor 35, and lateral acceleration signal $a_y$ from sensor 36.

Brake controller 50 is an electronic circuit comprised of one or more components that are assembled as a common unit. Alternatively, for the multiple component embodiments, one or more of these components may be distributed throughout vehicle 20. Brake controller 50 may be comprised of digital circuitry, analog circuitry, or both (e.g. an application specific integrated circuit). Also, brake controller 50 may be programmable, a dedicated state machine, or a hybrid combination of programmable and dedicated hardware. All signals described herein can be in analog form or in digital form. Thus, to implement the principals of the present invention, brake controller 50 can further include any control clocks, interfaces, signal conditioners, filters, Analog-to-Digital (A/D) converters, Digital-to-Analog (D/A) converters, communication ports, or other types of operators as would occur to those having ordinary skill in the art.

In one embodiment, brake controller 50 includes one or more central processing units 51 operatively coupled to one or more solid-state memory devices 52. Memory device(s) 52 contain programming corresponding to flowchart 60 (FIG. 3) for implementing a dynamic side-to-side braking method of the present invention and is arranged for reading and writing of data in accordance with the principals of the present invention.

Steering controller 40 and brake controller 50 represent an improvement in a braking performance by vehicle 20 during a combined cornering and braking maneuver through a new and unique utilization of frictional forces among tires 21a–21d. The primary principle of the present invention is to achieve a total brake force distribution of brake forces $F_{xLF}$-$F_{xRR}$ among tires 21a–21d, respectively, during the combined cornering and braking maneuver that approximates a total normal force distribution of a normal left front tire force $N_{LF}$, a normal right front tire force $N_{LF}$, a normal left rear tire force $N_{LR}$, and a normal right rear tire force $N_{RR}$ in accordance with the following equations [2a]–[2d], respectively:

$$N_{LF}=m*g*b/(2*L)+m*a_x*h_{cg}/(2*L)+k_{rollf}*m*h_{cg}*a_y/t_w \quad [2a]$$

$$N_{RF}=m*g*b/(2*L)+m*a_x*h_{cg}/(2*L)-k_{rollf}*m*h_{cg}*a_y/t_w \quad [2b]$$

$$N_{LR}=m*g*a/(2*L)-m*a_x*h_{cg}/(2*L)+k_{rollr}*m*h_{cg}*a_y/t_w \quad [2c]$$

$$N_{RR}=m*g*a/(2*L)-m*a_x*h_{cg}/(2*L)-k_{rollr}*m*h_{cg}*a_y/t_w \quad [2d]$$

where m is the total mass of vehicle 20, g is gravity, a is the distance between front axle 22a and the center of gravity of vehicle 20, b is the distance between rear axle 22b and the center of gravity of vehicle 20, L is a wheelbase of vehicle 10 equaling a distance between front axle 22a and rear axle 22b, $h_{cg}$ is a height of a center of gravity of vehicle 20 above ground, and $t_w$ is track width of front axle 22a and rear axle 22b. Symbol $k_{rollf}$ denotes a fraction of a total suspension roll stiffness contributed by a front suspension (not shown) of vehicle 20, and $k_{rollr}=1-k_{rollf}$ is the fraction of total roll stiffness contributed by a rear suspension (not shown) of vehicle 20. In one embodiment, $k_{rollf}$ is in accordance with the following equation [3]:

$$k_{rollf}=\kappa_f/(\kappa_f+\kappa_r) \quad [3]$$

where $\kappa_f$ and $\kappa_r$ are the nominal roll stiffness of the front suspension and the rear suspension, respectively. In equations [2a]–[2d], $m*g*a/(2*L)$ and $m*g*b/(2*L)$ represent the static normal load on the corresponding tire, $m*a_x*h_{cg}/(2*L)$ represents a load transfer due to longitudinal acceleration $a_x$ which is assumed positive during braking, and $k_{rollf}*m*h_{cg}*a_y/t_w$ and $k_{rollr}*m*h_{cg}*a_y/t_w$ represent a load transfer due to lateral acceleration $a_y$ which is positive in a right hand turn and negative in a left hand turn.

Figure 3:
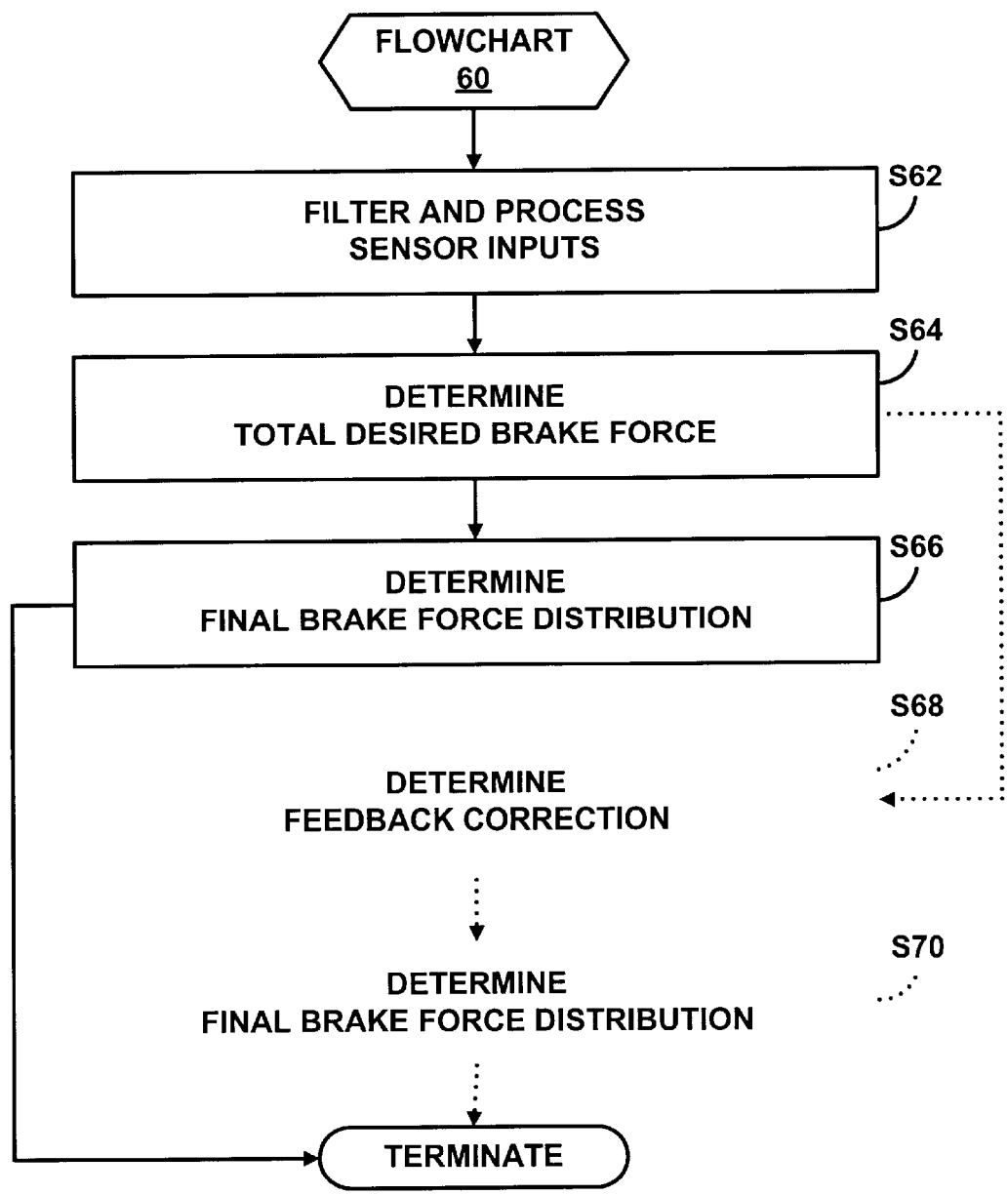
FIG. 3 is a flow chart illustrating a dynamic braking method in accordance with the present invention.

FIG. 3 illustrates a flowchart 60 implemented by brake controller 50 during a combined cornering and braking maneuver of vehicle 20. During a stage S62 of flowchart 60, brake controller 50 filters and processes inputs from sensors 32a–32d, and 34–36. Specifically, vehicle left front tire speed signal $V_{sLF}$, vehicle right front tire speed signal $V_{sRF}$, vehicle left rear tire speed signal $V_{sLR}$, and vehicle right rear tire speed signal $V_{sRR}$ from sensors 32a–32d, respectively, are processed as known in the art to obtain a vehicle speed signal $V_x$. Yaw rate signal $_s$, longitudinal acceleration signal $a_x$, and lateral acceleration signal $a_y$ as well as vehicle speed signal $V_x$ are conditioned as required by the remaining stages of flowchart 60.

Longitudinal acceleration signal $a_x$ and lateral acceleration signal $a_y$ are estimated in an embodiment of a vehicle in accordance with the present invention that excludes sensor 35 and sensor 36. Longitudinal acceleration signal $a_x$ can be estimated as a function of brake pedal position signal $BPP_s$ and/or brake fluid pressure signal $BFP_s$ as would occur to those having ordinary skill in the art. Lateral acceleration signal $a_y$ can be estimated as a function of steering angle signal $\delta_s$ and vehicle speed signal $V_x$. In one embodiment, the following equation [4] is utilized to estimate a desired lateral acceleration signal $a_{ydes}$:

$$a_{ydes}=v_x^2*\delta_s/(L+K_u*v_x^2) \quad [4]$$

where L is the wheelbase of vehicle 20 and $K_u$ is the understeer coefficient of vehicle 20. Another method of dynamically determining the desired lateral acceleration signal $a_{ydes}$ is described in U.S. Pat. No. 5,931,887, which is hereby incorporated by reference. The magnitude of the desired lateral acceleration signal $a_{ydes}$ can be limited by a maximum lateral acceleration achievable on dry surface for vehicle 20 (e.g., approximately 8 m/s² when vehicle 20 is a sedan).

Flowchart 60 proceeds to a stage S64 upon a completion of stage S62. During stage S64, a total desired brake force $F_{xdestot}$ is determined. In one embodiment, as known in the art, total desired brake force $F_{xdestot}$ is determined as a function of brake pedal position signal $BPP_s$ and/or brake fluid pressure signal $BFP_s$ as well as a constant factor. The magnitude of total desired brake force $F_{xdestot}$ can be limited by a maximum desired brake force. In a second embodiment, total desired brake force $F_{xdestot}$ is determined by the following equation [5]:

$$F_{xdestot} = m^* a_{xdes} \quad [5]$$

Flowchart 60 proceeds to a stage S66 upon a completion of stage S64. During stage S66, a final brake force distribution of brake forces $F_{xLF}$-$F_{xRR}$ among tires 21a–21d, respectively, of vehicle 20 is determined. In one embodiment, brake forces $F_{xLF}$-$F_{xRR}$ are determined in accordance with the following equations [6a]–[6d]:

$$F_{xLF} = m^* a_{xdes} \cdot [b/(2^*L) + a_x^* h_{cg}/(2^*L^*g) + \eta^* k_{rollf}^* h_{cg}^* a_y/(t_w^*g)] \quad [6a]$$

$$F_{xRF} = m^* a_{xdes} \cdot [b/(2^*L) + a_x^* h_{cg}/(2^*L^*g) - \eta^* k_{rollf}^* h_{cg}^* a_y/(t_w^*g)] \quad [6b]$$

$$F_{xLR} = m^* a_{xdes} \cdot [a/(2^*L) - a_x^* h_{cg}/(2^*L^*g) + \eta^* k_{rollr}^* h_{cg}^* a_y/(t_w^*g)] \quad [6c]$$

$$F_{xRR} = m^* a_{xdes} \cdot [a/(2^*L) - a_x \cdot h_{cg}/(2^*L^*g) - \eta^* k_{rollr}^* h_{cg}^* a_y/(t_w^*g)] \quad [6d]$$

where a brake distribution factor $\eta$ is a ratio of lateral load transfer among tires 21a–21d, and a magnitude of brake distribution factor $\eta$ varies from 0 to 1. Alternatively, programming within brake controller 50 corresponding to equations [6a]–[6d] can be replaced by look up tables depending on longitudinal acceleration signal $a_x$ and lateral acceleration signal $a_y$.

From equations [6a]–[6d], when brake distribution factor $\eta$=1, the brake force distribution of brake forces $F_{xLF}$-$F_{xRR}$ is proportional to the distribution of normal forces $N_{LF}$-$N_{RR}$. When brake distribution factor $\eta$=0, brake force $F_{xLF}$ and brake force $F_{xRF}$ are equal while brake force $F_{xLR}$ and brake force $F_{xRR}$ are equal. In one embodiment, brake force distribution factor $\eta$ is a feed forward component that is a function of longitudinal acceleration signal $a_x$ of vehicle 20. More specifically, brake distribution factor $\eta$ equates a nominal value (e.g., 1.0 for vehicles with active steering such as vehicle 20, and 0.6 for vehicles without active steering) when longitudinal acceleration signal axis less than or equal to 80% of a maximum longitudinal acceleration of vehicle 20 (e.g., approximately 10 m/s²). Brake distribution factor $\eta$ is linearly reduced as longitudinal acceleration signal $a_x$ increases above 80% of a maximum longitudinal acceleration of vehicle 20 until brake distribution factor $\eta$ approximates 0.2 lower than the nominal value (e.g., 0.8 for vehicles with active steering such as vehicle 20, and 0.4 for vehicles without active steering). The dynamic determination of brake distribution factor $\eta$ prevents vehicle 20 from an oversteer during a light and moderate braking in a turn while limiting an understeer of vehicle 20 during very heavy braking in a turn. In another embodiment, brake distribution factor $\eta$ can be increased slightly as a function of a high vehicle speed $V_x$ in order to promote understeer during braking in turn at high speeds.

Flowchart 60 is terminated upon a completion of stage S66.

Figure 4:
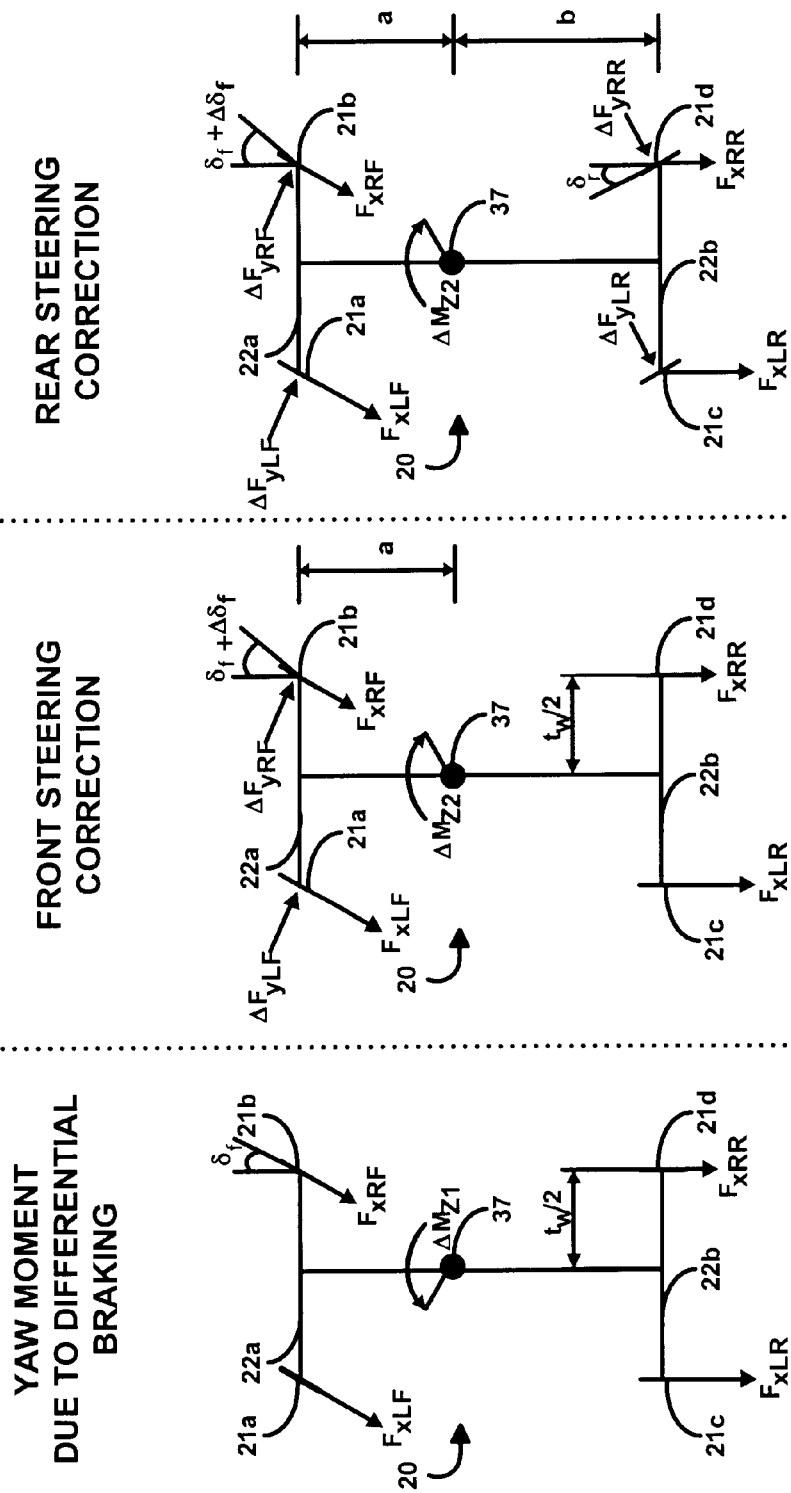
FIG. 4 is an illustration of a generation of a yaw moment during a braking and a cornering maneuver of the vehicle of FIG. 2A.

FIG. 4 illustrates a yaw moment $\Delta M_{z1}$ produced by differential braking in accordance with the final braking force distribution of $F_{xLF}$-$F_{xRR}$. Vehicle 20 is equipped with active steering system whereby the final braking force distribution of $F_{xLF}$-$F_{xRR}$ is proportional to the normal force distribution of $N_{LF}$-$N_{RR}$ with an excess of yaw moment $\Delta M_{z1}$ being counterbalanced by lateral forces resulting from a steering correction of either front tires 21a and 21b and/or rear tire 21c and 21d as controlled by an implementation of a flowchart 80 by steering controller 40.

Figure 5:
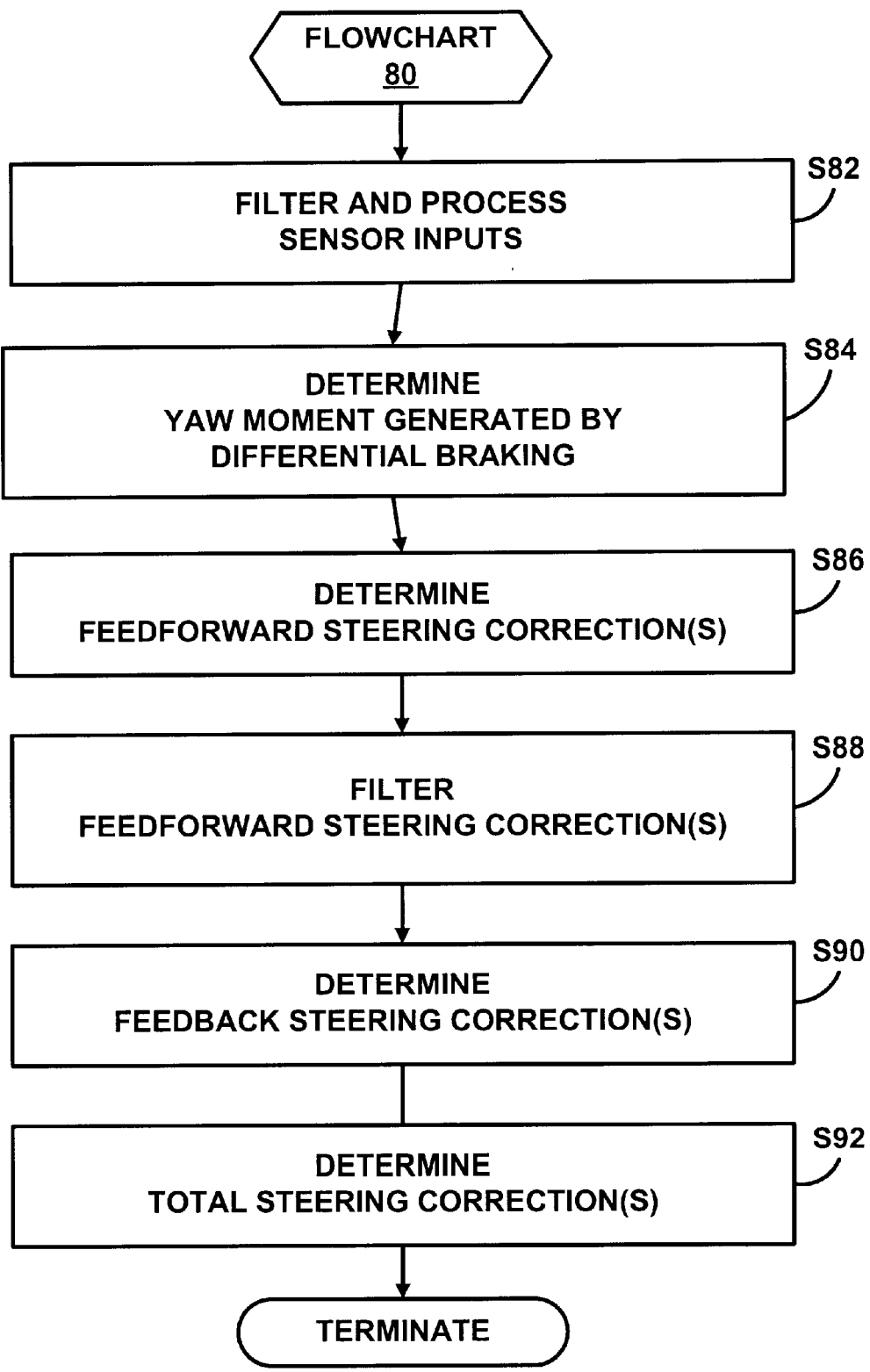
FIG. 5 is flow chart illustrating a dynamic steering method in accordance with the present invention.

FIG. 5 illustrates flowchart 80. During a stage S82 of flowchart 80, steering controller 40 filters and processes braking force distribution of $F_{xLF}$-$F_{xRR}$ from brake controller 50. Steering controller 40 proceeds to a stage S84 of flowchart 80 upon a completion of stage S82 to determine yaw moment $\Delta M_{z1}$ in accordance with the following equation [7]:

$$\Delta M_{z1} = (F_{xLF} - F_{xRF} + F_{xLR} - F_{xRR})^* t_w/2 \quad [7]$$

Alternatively, yaw moment $\Delta M_z$ is determined in accordance with the following equation [8]:

$$\Delta M_{z1} = \eta^* a_{xdes}^* a_y^* m^* h_{cg}/g \quad [8]$$

In order to fully compensate yaw moment $\Delta M_{z1}$ by steering, a yaw moment $\Delta M_{z2}$ generated by the change in tire lateral forces due to instantaneous change in the steering angle must be equal in magnitude, but opposite in sign, to yaw moment $\Delta M_{z1}$. Steering controller 40 therefore proceeds to a stage S86 of flowchart 80 upon a completion of stage S84 to determine either a front steering correction $\Delta \delta_f$ or a rear steering correction $\Delta \delta_r$ as a function of yaw moment $\Delta M_{z1}$ in accordance with the following equations [9a] and [9b], respectively:

$$\Delta \delta_f = \Delta M_{z1}/(2^* C_{yf}^* a) \quad [9a]$$

$$\Delta \delta_r = -\Delta M_{z1}/(2^* C_{yr}^* b) \quad [9b]$$

where $C_{yf}$ denote a front tire cornering stiffness coefficients of front tires 21a and 21b, and $C_{yr}$ denote a rear tire cornering stiffness coefficients of rear tires 21c and 21d. Alternatively, front steering correction $\Delta \delta_f$ and rear steering correction $\Delta \delta_r$ are both determined as functions of yaw moment $\Delta M_{z1}$ in accordance with the following equations [10a] and [10b], respectively:

$$\Delta \delta_f = (\epsilon^* \Delta M_{z1})/(2^* C_{yf}^* a) \quad [10a]$$

$$\Delta \delta_r = (-\epsilon^* \Delta M_{z1})/(2^* C_{yr}^* b) \quad [10b]$$

where $\epsilon$ constitutes a fraction yaw moment $\Delta M_{z1}$ having a range of $0 < \epsilon \leq 1$. During operation of vehicle 20, cornering stiffness $C_{yf}$ and cornering stiffness $C_{yr}$ can vary with normal load and above all with the side slip angle of tires 21a–21d, respectively. Thus, cornering stiffness $C_{yf}$ and cornering stiffness $C_{yr}$ may significantly deviate from their nominal values. In general, cornering stiffness $C_{yf}$ and cornering stiffness $C_{yr}$ decrease with an increase in tire slip angles which tend to increase with lateral acceleration of vehicle 20, and/or steering angle of tires 21a–21d. Thus, for optimal performance it is recommended that the values of the steering correction factor $\epsilon$ or the entire product be determined through vehicle tests as a function of lateral acceleration signal $a_y$. Typically, the factor $\epsilon$ will be constant (or nearly constant) for the range of lateral acceleration of vehicle 20 up to about 0.8 times the maximum lateral acceleration that vehicle 20 can generate on dry surface, and may increase somewhat after that. For the rear active steering control, factor $\epsilon$ may also increase with an increase in a longitudinal deceleration of vehicle 20 or an increase in braking force, since braking reduces cornering stiffness of the rear axle as a result of reduction in normal forces.

Steering controller 40 proceeds to a stage S88 of flowchart 80 upon a completion of stage S86 to filter the feedforward front steering correction $\Delta\delta_f$ and feedforward rear steering correction $\Delta\delta_r$. In one embodiment, feedforward front steering correction $\Delta\delta_f$ and feedforward rear steering correction $\Delta\delta r$ are passed through a high pass filter in accordance with the following transfer function equation [11]:

$$G_f(s)=s/(s+a_f) \quad [11]$$

where $a_f$ is a filter parameter with a typical value of 0.4 rad/s. This results a front filtered value $\Delta\delta_{ffilt}$ and a rear filtered value $\Delta\delta_{rfilt}$ in accordance with the following time domain equations [12a] and [12b]:

$$\Delta\delta_{ffilt}(t)=(1-a_f{}^*t)^*\Delta\delta_{ffilt}(t-t)+\Delta\delta_f(t)-\Delta\delta_f(t-t) \quad [12a]$$

$$\Delta\delta_{rfilt}(t)=(1-a_f{}^*t)^*\Delta\delta_{rfilt}(t-t)+\Delta\delta_r(t)-\Delta\delta_r(t-t) \quad [12b]$$

where t refers to the present time instant and t is a sampling interval.

Steering controller 40 proceeds to a stage S90 of flowchart 80 upon a completion of stage S88 to determine a feedback front steering correction $\Delta\delta_{ffb}$ and a feedback rear steering correction $\Delta\delta_{rfb}$ as described in U.S. Patent Application entitled "Integrated Control Of Active Tire Steer and Brakes" hereby incorporated by reference in its entirety. Steering controller 40 proceeds to a stage S92 of flowchart 80 upon a completion of stage S90 to determine a total front steering correction $\Delta\delta_{ftot}$ and a total rear steering correction $\Delta\delta_{rtot}$ in accordance with the following equations [13a] and [13b], respectively:

$$\Delta\delta_{ftot}=\Delta\delta_{ffilt}+\Delta\delta_{ffb} \quad [13a]$$

$$\Delta\delta_{rtot}=\Delta\delta_{rfilt}+\Delta\delta_{rfb} \quad [13b]$$

Steering controller 40 provides total front steering correction $\Delta\delta_{ftot}$ and/or a total rear steering correction $\Delta\delta_{rtot}$ to actuators 23a and 23b, respectively.

Flowchart 80 is terminated upon a completion of stage S92.

Flowchart 60 as shown in FIG. 3 includes optional stages S68 and S70 for vehicles without active steer control whereby a proposed side to side brake force distribution is less than proportional to the normal load transfer. During stage S68, yaw moment resulting from disturbances, parameter variations, and environmental variations is roughly balanced by a desired yaw moment $\Delta M_{zd}$ resulting in a total brake distribution factor $\eta_{tot}$ in accordance with the following equations [14]–[17]:

$$\Delta v_{lr}=K_{\Omega P}(v_x, \mu)^*(\Omega_d-\Omega)+K_{106\ d}(v_x, \mu)^*d(\Omega_d-\Omega)/dt+K_{vyd}(v_x, \mu)^*d(v_{yd}-v_y)/dt \quad [14]$$

$$\Delta M_{zd}=C_x{}^*\Delta v_{lr}/v_x \quad [15]$$

$$\Delta\eta=\Delta M_{zd}{}^*g/(a_{xdes}{}^*a_y{}^*m^*h_{cg}) \quad [16]$$

$$\eta_{tot}=\eta+\Delta\eta \quad [17]$$

where a plurality of control gains $K_{\Omega P}$, $K_{\Omega d}$, and $K_{vyd}$ are dependent upon vehicle speed signal $v_x$, an estimated surface coefficient of adhesion $\mu$, and a steer flag (over- or under-steer); $\Omega_d$ is a desired yaw rate; $v_y$ is a lateral velocity $v_y$; $v_{yd}$ is a desired lateral velocity $v_y$; and $C_x$ is the longitudinal stiffness of tires 21a–21d. The signal $\Delta v_{lr}$ denoting a desired difference in wheel speeds between left wheels and right wheels may be computed as described in U.S. Pat. No. 6,035,251, issued Mar. 7, 2000, and entitled "Brake System Control method Employing Yaw Rate And Slip Angle Control", the entirety of which is hereby incorporated by reference.

In order to avoid division by zero in equation [16], the magnitudes of lateral acceleration $a_y$ and longitudinal acceleration $a_x$ are limited from below by constant values (e.g., 2 m/s$^2$). In addition, the magnitude of the factor $\Delta\eta$ is limited to a reasonable value $\Delta\eta_{max}$ which is selected so that the total brake distribution factor $\eta_{tot}$ does not exceed the range of <0;1>.

Brake controller 50 proceeds to a stage S70 of flowchart 60 upon a completion of stage S68 to determine a final brake force distribution as a function of total brake distribution factor $\eta_{tot}$ in accordance with the following equations [18a]–[18d]:

$$F_{xLF}=m^*a_{xdes}{}^*[b/(2^*L)+a_x{}^*h_{cg}/(2^*L^*g)+\eta_{tot}{}^*k_{rollf}{}^*h_{cg}{}^*a_y/(t_w{}^*g)] \quad [18a]$$

$$F_{xRF}=m^*a_{xdes}{}^*[b/(2^*L)+a_x{}^*h_{cg}/(2^*L^*g)-\eta_{tot}{}^*k_{rollf}{}^*h_{cg}{}^*a_y/(t_w{}^*g)] \quad [18b]$$

$$F_{xLR}=m^*a_{xdes}{}^*[a/(2^*L)-a_x{}^*h_{cg}/(2^*L^*g)+\eta_{tot}{}^*k_{rollr}{}^*h_{cg}{}^*a_y/(t_w{}^*g)] \quad [18c]$$

$$F_{xRR}=m^*a_{xdes}{}^*[a/(2^*L)-a_x\cdot h_{cg}/(2^*L^*g)-\eta_{tot}{}^*k_{rollr}{}^*h_{cg}{}^*a_y/(t_w{}^*g)] \quad [18d]$$

Flowchart 60 is terminated upon a completion of stage S70.

From the description herein of the present invention, those having ordinary skill in the art will appreciate stages S62–S66 of flowchart 60 represent a feedforward control method which is effective in nominal conditions. In order to achieve robustness of performance of vehicle 20 with respect to changes in vehicle parameters (e.g., payload, a road surface coefficient of adhesion, road roughness, etc.,) a feedback control loop is introduced. Flowchart 80 represents a feedback control loop for vehicle 20 whereby any required correction in a yaw response of vehicle 20 is achieved by changes in the steering angle of front tires 21a and 21b and/or rear tires 21c and 23d. Stages S62, S64, S68, and S70 of flowchart 60 represent a feedback control loop for vehicles in accordance with the present invention only having an active brake control system whereby brake distribution factor is increased when such a vehicle is in oversteer and is decreased when such a vehicle is in understeer.

Those having ordinary skill in the art will also appreciate various advantages of the present invention. One advantage is an improvement in a utilization of a friction potential of all vehicle tires, especially of the outside tires in a combined braking and cornering maneuver. A second advantage is an improvement in a trade off between vehicle cornering ability (i.e., lateral acceleration) and deceleration (i.e., longitudinal deceleration) in a combined braking and cornering maneuver. A third advantage is an achievement of a neutral handling behavior of the vehicle either by side to side proportioning or by side to side proportioning combined with steering correction. A fourth advantage is a less steering correction required by a driver to maintain vehicle on desired path in a combined braking and cornering maneuver. A fifth advantage is a delayed entry or no need for entry into ABS or Traxxar modes during a combined braking and cornering maneuver. A sixth advantage is a robustness with respect to parameter and environmental variations achieved through closed loop control. A seventh advantage is an improvement in stopping distances on inclined roads.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A method of dynamically controlling an operation of a vehicle during a combined braking and cornering maneuver by the vehicle, said method comprising:
   determining a desired brake force for a plurality of tires of the vehicle; and
   determining a brake force distribution of the desired brake force among the plurality of tires, the brake force distribution being approximately proportional to a normal force distribution among the plurality of tires during the combined braking and cornering maneuver.

2. The method of claim 1, further comprising:
   operating a braking system of the vehicle in accordance with a determination of the brake force distribution.

3. The method of claim 2, further comprising:
   determining a steering correction to counterbalance at least a portion of a yaw moment experienced by the vehicle during the combined braking and cornering maneuver.

4. The method of claim 3, further comprising:
   operating a steering system of the vehicle as a function of the steering correction.

5. The method of claim 1, further comprising:
   determining a braking correction as a function of the desired brake force to counterbalance at least a portion of a yaw moment experienced by the vehicle during the combined braking and cornering maneuver,
   wherein the brake force distribution is determined as a function of the braking correction.

6. The method of claim 5, further comprising:
   operating the braking system in accordance with a determination of the brake force distribution.

7. A vehicle, comprising:
   a plurality of tires; and
   a brake controller,
   wherein said brake controller is operable to determine a desired brake force for said plurality of tires during a combined braking and cornering maneuver by said vehicle, and
   wherein said brake controller is further operable to determine a brake force distribution of the desired brake force among said plurality of tires, the brake force distribution being approximately proportional to a normal force distribution among said plurality of tires during the combined braking and cornering maneuver.

8. The vehicle of claim 7, further comprising:
   braking system operable to apply a braking force to each tire of said plurality of tires in accordance with a determination of the brake force distribution by said brake controller.

9. The vehicle of claim 8, further comprising:
   a steering controller operable to determine a steering correction to one or more tires of said plurality of tires to counterbalance at least a portion of a yaw moment experienced by the vehicle during the combined braking and cornering maneuver.

10. The vehicle of claim 9, further comprising:
    a steering system operable to apply the steering correction to one or more tires of said plurality of tires.

11. The vehicle of claim 8,
    wherein said brake controller is further operable to determine a braking correction as a function of the desired brake force to counterbalance at least a portion of a yaw moment experienced by the vehicle during the combined braking and cornering maneuver, and
    wherein said brake controller is further operable to determine the brake force distribution as a function of the braking correction.

12. The vehicle of claim 11,
    wherein said braking system is operated in accordance with a determination of the brake force distribution during the combined cornering and braking maneuver.

13. A vehicle, comprising:
    a plurality of tires; and
    a brake controller including
    means for determining a desired brake force for said plurality of tires during a combined braking and cornering maneuver by said vehicle, and
    means for determining a brake force distribution of the desired brake force among said plurality of tires, the brake force distribution being approximately proportional to a normal force distribution among said plurality of tires during the combined braking and cornering maneuver.

14. The vehicle of claim 13, further comprising:
    a braking system operable to apply a braking force to each tire of said plurality of tires in accordance with a determination of the brake force distribution by said brake controller.

15. The vehicle of claim 14, further comprising:
    a steering controller including means for determining a steering correction to one or more tires of said plurality of tires to counterbalance at least a portion of a yaw moment experienced by the vehicle during the combined braking and cornering maneuver.

16. The vehicle of claim 15, further comprising:
    a steering system operable to apply the steering correction to one or more tires of said plurality of tires.

17. The vehicle of claim 14,
    wherein said brake controller further includes means for determining a braking correction as a function of the desired brake force to counterbalance at least a portion of a yaw moment experienced by the vehicle during the combined braking and cornering maneuver.

18. The vehicle of claim 17,
    wherein said braking system is operated in accordance with a determination of the brake force distribution during the combined cornering and braking maneuver.

19. The vehicle of claim 14, further comprising:
    a steering controller including
    means for determining a yaw moment generated by a differential braking of said braking system;
    means for determining a feedforward steering correction as a function of the yaw moment;
    means for filtering the feedforward steering correction;
    means for determining a feedback steering correction as a function of the feedforward steering correction upon a filtering of the feedforward steering correction; and
    means for determining a steering correction as a function of the feedforward steering correction and the feedback steering correction.

20. The vehicle of claim 19, further comprising:
    a steering system operable to apply the steering correction to one or more tires of said plurality of tires.

* * * * *